US006762871B2

(12) United States Patent
Yoshimura

(10) Patent No.: US 6,762,871 B2
(45) Date of Patent: Jul. 13, 2004

(54) SWITCHABLE MIRROR GLASS USING MAGNESIUM-CONTAINING THIN FILM

(75) Inventor: Kazuki Yoshimura, Nagoya (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 0 days.

(21) Appl. No.: 10/385,111

(22) Filed: Mar. 11, 2003

(65) Prior Publication Data

US 2003/0169476 A1 Sep. 11, 2003

(30) Foreign Application Priority Data

Mar. 11, 2002 (JP) ......................................... 2002-065004
Mar. 14, 2002 (JP) ......................................... 2002-070824

(51) Int. Cl.[7] ........................... G02F 1/15; G02F 1/153; H01L 47/00; G02B 6/26
(52) U.S. Cl. ........................... 359/265; 267/275; 257/1; 257/2; 385/16
(58) Field of Search ................................ 359/265, 267, 359/274, 275; 257/1, 2, 4, 107, 108; 385/16, 18

(56) References Cited

U.S. PATENT DOCUMENTS

| | | | | |
|---|---|---|---|---|
| 5,635,729 A | * | 6/1997 | Griessen et al. ............... | 257/2 |
| 5,652,433 A | * | 7/1997 | Ouwerkerk et al. ........... | 257/1 |
| 5,905,590 A | * | 5/1999 | Van Der Sluis et al. ..... | 359/275 |
| 6,006,582 A | | 12/1999 | Bhandari et al. | |
| 6,101,298 A | | 8/2000 | Den Broeder et al. | |
| 6,146,505 A | | 11/2000 | Murakame et al. | |
| 6,333,111 B1 | | 12/2001 | Murakami et al. | |
| 6,608,713 B2 | * | 8/2003 | Ouwerkerk et al. ........ | 359/275 |
| 6,647,166 B2 | * | 11/2003 | Richardson .................. | 385/16 |

FOREIGN PATENT DOCUMENTS

| WO | WO 98 06000 | 2/1998 |
|---|---|---|
| WO | WO 00 17706 | 3/2000 |
| WO | WO 02 14921 | 2/2002 |

OTHER PUBLICATIONS

European Search Report for EP 03 00 5555 dated Jul. 10, 2003.
Yoshimura K. et al; "Optical Switching of MG–Rich MG–NI Alloy Thin Films" Applied Physics Letters, American Institute of Physics. New York, US, vol. 81, No. 25, Dec. 16, 2002, pp. 4709–4711.

* cited by examiner

Primary Examiner—Loha Ben
(74) Attorney, Agent, or Firm—Sughrue Mion, PLLC

(57) ABSTRACT

The present invention provides a switchable mirror material comprising (1) a magnesium thin film having a thickness of 40 nm or less, or a magnesium-nickel alloy thin film having an alloy composition represented by $MgNi_x$ ($0.1 < x < 0.3$), (2) a transparent catalyst layer formed on a surface of the magnesium-containing thin film, and (3) a transparent protective layer optionally formed on the catalyst layer. The switchable mirror material has a chromic property which allows the thin film to be switched from a mirror state into a transparent state by means of hydrogenation of the thin film at about 20° C., and to be switched from the transparent state into the mirror state by means of dehydrogenation of the thin film in the range of about 20° C. to 100° C. The present invention also provides a switchable mirror glass having a surface formed with the switchable mirror material, a switchable mirror window, a method of switching the states of a switchable mirror glass, and an article having the switchable mirror function.

27 Claims, 9 Drawing Sheets

Schematic Diagram of Switchable Mirror Tester

Schematic Diagram of Sputtering Apparatus

Schematic Diagram of Switchable Mirror Tester (a) mirror state  (b) transparent state Light transmittances of samples each having a different composition ratio of Ni to Mg, at a wavelength of 670 nm after 30 minutes from exposure of the samples to hydrogen gas (a) Optical Transmittance Spectra (b) Optical Reflectance Spectra Optical spectra of a switchable mirror material comprising a magnesium-nickel alloy thin film Variation of light transmittance of a sample having a composition of $MgNi_{0.2}$ at a different temperature, wherein hydrogen gas of 1 atm was introduced at the time T = 5 s, and then air of 1 atm was introduced at the time T = 100 s

SWITCHABLE MIRROR GLASS USING MAGNESIUM-CONTAINING THIN FILM

FIELD OF THE INVENTION

The present invention relates to a switchable mirror glass using a magnesium thin film or a magnesium-nickel alloy thin film (hereinafter collectively, "magnesium-containing thin film"), and, more specifically, the present invention relates to a novel switchable mirror material for use in a switchable glass capable of automatically controlling sunlight incident from a windowpane without a sunblind or curtain, a switchable mirror glass produced using the same material, and a method of controlling the same switchable mirror glass.

The present invention is a valuable material technology for controlling the light transmittance of a window in buildings or vehicles.

BACKGROUND OF THE INVENTION

Generally, a great amount of heat comes in and out through windows (openings) in a building. For example, about 48% of heat from a heating system for winter flows out through windows, and about 71% of heat comes in an air-cooled room through windows in summer time. If the sunlight/heat transfer through windows is adequately controlled, an enormous amount of energy savings can be effectively achieved.

A switchable glass has been developed for the purpose of controlling the sunlight/heat transfer through windows.

There have been proposed various types of systems for controlling such a switchable glass. Among them, 1) a material having a light transmittance property reversibly changeable in response to current/voltage applied thereto is referred to as "electrochromic material", 2) a material having a light transmittance property changeable in response to the temperature thereof is referred to as "thermochromic material", and 3) a material having a light transmittance property changeable by controlling the state of atmospheric gas is referred to as "gasochromic material". Particularly, an electrochromic switchable glass using a tungsten trioxide thin film as a switchable layer has been extensively researched toward the practical use thereof, and some related products have already been placed on the market.

In principle, all of the conventional electrochromic switchable glasses are designed to control absorption level of incident light by the switchable layer such as a tungsten trioxide thin film. Thus, the switchable layer is inevitably heated as it absorbs the light, and the resulting heat will be reradiated toward a room, resulting in a deteriorated energy saving effect. To solve this problem, reflection level instead of absorption level of the incident light should be controlled. That is, it is desired to provide a material that can be reversibly changed between mirror and transparent states.

While it was quite difficult to discover such a material having a property reversibly changeable between mirror and transparent states, a research group in Holland discovered in 1996 that hydrides of rare earth metals, such as, yttrium or lanthanum, are reversibly changeable between mirror and transparent states in response to hydrogen. This material was named a "switchable mirror" (J. N. Huiberts, R. Griessen, J. H. Rector, J. R. Wijngaarden, J. P. Dekker, D. G. de Groot, N. J. Koeman, Nature 380 (1996) 231). While the rare earth hydrides have an excellent switchable mirror property of a large variation of light transmittance, the limited availability of rare earth materials and their hydrides, and high cost make it disadvantageous to use the switchable mirror as a coating of windows.

In 2001, a research group in the USA discovered a magnesium-nickel alloy $Mg_2Ni$ as a new switchable mirror material (T. J. Richardson, J. L. Slack, R. D. Armitage, R. Kostecki, B. Farangis, and M. D. Rubin, Appl. Phys. Lett. 78 (2001) 3047). $Mg_2Ni$ is expected to be a more suitable material for windowpane coatings because it is made of magnesium and nickel, which are more readily available and cost less than rare earth materials. $Mg_2Ni$ has a high reflectance in its mirror state, but a low visible light transmittance (20% from literature) in its transparent state. Thus, this material can be practically used only after the visible light transmittance in the transparent state is increased up to an adequate level.

Some materials are known to have the switchable mirror properties, such as hydrides of rare earth metal such as yttrium or lanthanum, rare earth-magnesium alloy hydrides, rare earth-gallium alloy hydrides, and magnesium-nickel alloy hydrides. Among them, the magnesium-nickel alloy hydrides are suitable as windowpane coatings in view of availability and cost. However, none of the previously reported magnesium-nickel alloys could be practically used due to their low light transmittance in their hydrogenated state. While the electrochromic switchable glass using a tungsten trioxide thin film has been extensively researched toward the practical use thereof, and some related products have already been placed on the market, as described above, the thin film has a complicated multilayer thin-film coating structure. This leads to extremely high cost which is a negative factor against promoting its use as a switchable window. Thus, there is still a strong need for new materials for a switchable glass with excellent properties and suitable for practical use.

SUMMARY OF THE INVENTION

Under the above circumstances, after extensive research on switchable properties of various compositions of magnesium and magnesium-nickel alloy thin films prepared through a sputtering method, the inventor found that (1) a magnesium thin film containing no nickel exhibits a specifically excellent switchable mirror property when it has a thickness less than a given value, (2) a film transparentized through hydrogenation exhibits a thermochromic property allowing the light transmittance of the film to be changed in response to its temperature, and (3) a new composition $MgNi_x$ ($0.1<x<0.3$) has a significantly higher light transmittance in the transparent state than $Mg_2Ni$. Based on these findings, the present invention was completed.

One object of the present invention is to provide a new type of switchable mirror material comprising a magnesium-containing thin film that is low in cost, and a catalyst layer containing, for example, a slight amount of palladium.

Another object of the present invention is to provide a switchable mirror glass window structure using the above switchable mirror material.

Still another object of the present invention is to provide a new switchable mirror material having a simple structure of two coating layers capable of facilitating cost reduction.

In order to achieve the above objects, according to a first aspect of the present invention, there is provided a switchable mirror material comprising (1) a magnesium thin film having a thickness of 40 nm or less, and preferably 10 to 20 nm, or a magnesium-nickel alloy thin film having an alloy composition represented by $MgNi_x$ wherein $0.1<x<0.3$, preferably, 0.16<x<0.2, (2) a transparent catalyst layer formed on a surface of the thin film, and optionally (3) a transparent protective layer formed on the catalyst layer. The switchable mirror material has a chromic property which allows the thin film to be switched from a mirror state into a transparent state by means of hydrogenation of the thin film, and to be switched from the transparent state into the mirror state by means of dehydrogenation of the thin film in a temperature range of about 20° C. to 100° C.

In the switchable mirror material in the first aspect of the present invention, the catalyst layer may be a palladium or platinum layer having a thickness in the range of 0.5 to 10 nm. The protective layer may be made of a hydrogen-permeable and water-impermeable material.

According to a second aspect of the present invention, there is provided a switchable mirror member comprising a transparent substrate, and a switchable layer including the switchable mirror material set forth in the first aspect of the present invention, wherein the switchable layer is formed on a surface of the transparent substrate.

In the switchable mirror member set forth in the second aspect of the present invention, the transparent substrate may be a transparent sheet made of acrylic or plastic material.

According to a third aspect of the present invention, there is provided a switchable mirror glass comprising a glass substrate, and a switchable layer including the switchable mirror material set forth in the first aspect of the present invention, wherein the switchable layer is formed on the glass substrate.

According to a fourth aspect of the present invention, there is provided a switchable mirror glass window which consists of double or triple glass plates. In this case, at least one of the glass plates is composed of the switchable mirror glass as set forth in the third aspect of the present invention with the switchable layer facing in the inward direction of the insulating glass structure.

In the switchable mirror glass window set forth in the fourth aspect of the present invention, the enclosed space between the glass plates is selectively supplied with either one of (1) hydrogen gas and (2) heated air or oxygen gas, from an atmospheric-state controller.

According to a fifth aspect of the present invention, there is provided a method of switching the states of a switchable mirror glass with a switchable layer including the switchable mirror material set forth in the first aspect of the present invention, by selectively causing hydrogenation and dehydrogenation in the switchable layer, in such a manner that the level of hydrogenation is selectively adjusted through at least one of a gasochromic process using hydrogen gas and an electrochromic process using electrolyte containing proton, and the level of dehydrogenation is selectively adjusted through at least one of a gasochromic process using air or oxygen gas, an electrochromic process using electrolyte and a thermochromic process based on heating.

According to a sixth aspect of the present invention, there is provided a method of switching the states of a switchable mirror member or glass with a switchable layer including the switchable mirror material set forth in the first aspect of the present invention, wherein the transition temperature of the magnesium thin film is set at any temperature in a given range in advance to allow the magnesium thin film to be automatically switched from the transparent state to the mirror state at the preset temperature in response to rise in atmospheric temperature.

In the method set forth in the sixth aspect of the present invention, the transition temperature may be set at any temperature in the range of about 20° C. to 100° C.

The transition temperature may be set depending on the thickness of the catalyst layer.

According to a seventh aspect of the present invention, there is provided a method of switching the states of a switchable mirror member or glass with a switchable layer including the switchable mirror material set forth in the first aspect of the present invention, wherein speed of dehydrogenation in the switchable layer is adjusted by controlling the temperature of air or oxygen gas to be supplied around the switchable layer. In this case, the level of dehydrogenation in the switchable layer to be varied according to the temperature of the air or oxygen gas may further be adjusted by controlling the thickness of the catalyst layer.

According to a eighth aspect of the present invention, there is provided an article comprising a switchable layer including the switchable mirror material set forth in the first aspect of the present invention, and either one of a switchable mirror glass and a switchable mirror member having a transparent substrate. The switchable layer is attached onto the surface of the switchable mirror glass or the transparent substrate.

The switchable mirror material having a magnesium-containing thin film or the switchable mirror glass using the switchable mirror material of the present invention has the following significant effects.

(1) The switchable mirror material of the present invention exhibits an excellent switchable mirror property far superior to the previously reported magnesium-nickel alloy $Mg_2Ni$.

(2) The switchable layer having the magnesium-containing thin film can be advantageously applied onto the inward-facing surface of the switchable mirror glass used as at least one of the glass plates in the switchable mirror glass window having an insulating glass structure, for example a double glazing structure, to allow the states of the magnesium-containing thin film to be switched by introducing hydrogen gas and others into the enclosed space between the glass plates.

(3) The switchable mirror material can be prepared by using a low-cost metal such as magnesium and nickel, and a slight amount of catalytic material such as palladium coated on the thin film. Thus, the switchable mirror material is significantly advantageous in cost benefit terms.

(4) The switchable mirror glass can be effectively used as various window glasses for not only buildings but also vehicles including automobiles.

(5) The switchable mirror glass can be widely used in not only windows but also various kinds of articles, such as, shielding for privacy protection, ornamental articles or toys utilizing the feature of switching between mirror and transparent states, to add the switchable mirror function thereto.

BRIEF DESCRIPTION OF THE DRAWINGS

FIGS. 5a and 5b show the respective states of a switchable mirror material comprising a magnesium thin film, wherein FIG. 5a shows a metallic state, and FIG. 5b shows a transparent state.

FIGS. 7a and 7b show optical spectra of a switchable mirror material comprising a magnesium-nickel alloy thin film, wherein FIG. 7a is an optical transmittance spectrum, and FIG. 7b is an optical reflectance spectrum.

DESCRIPTION OF THE PREFERRED EMBODIMENT

Figure 1:
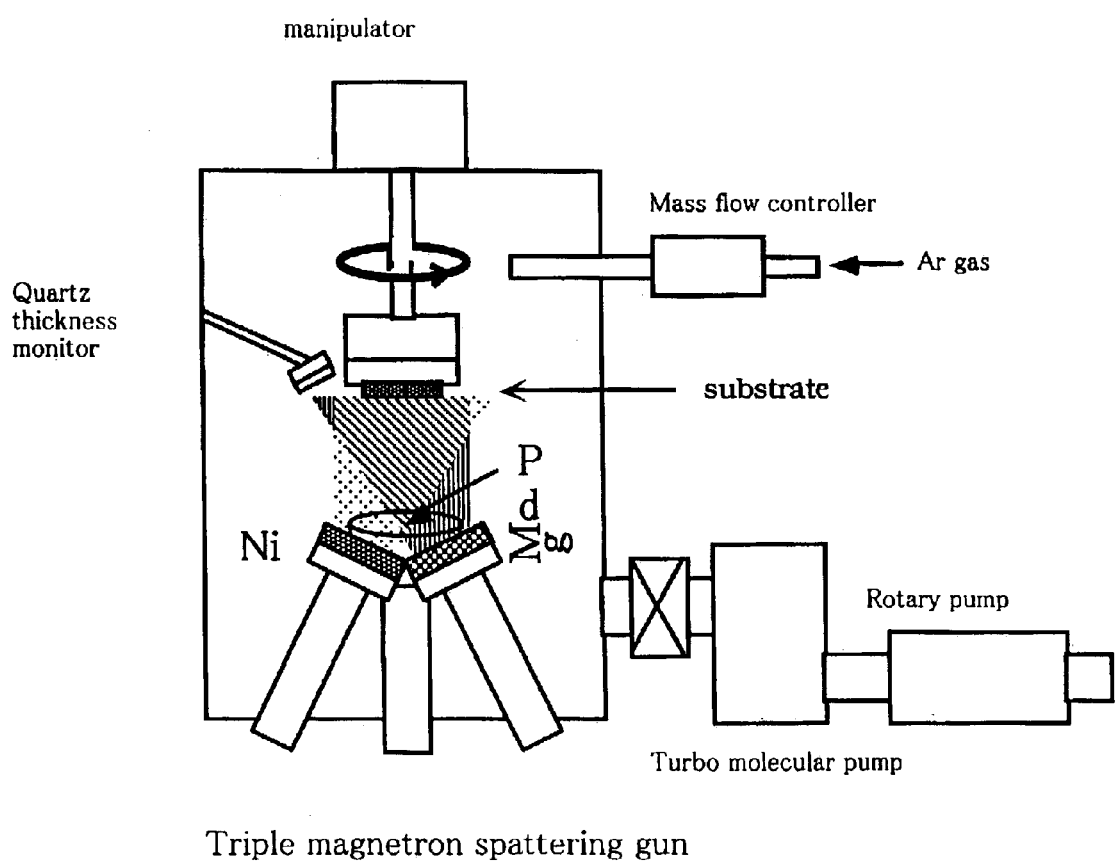
FIG. 1 is a schematic diagram showing a sputtering apparatus used for preparing a magnesium and magnesium-nickel alloy thin film of a switchable mirror material of the present invention.

The present invention will now be described in more detail.

A switchable mirror material of the present invention comprises (1) a magnesium thin film having a thickness of 40 nm or less, or a magnesium-nickel alloy thin film having a specific composition represented by $MgNi_x$ (0.1<x<0.3), and (2) a catalyst layer formed on the surface of the magnesium or magnesium-nickel alloy thin film. The catalyst layer may be made of palladium, platinum or any other suitable material having an effect equivalent to that of palladium or platinum.

The magnesium-containing thin film having an excellent switchable property may be prepared by, for example, a sputtering method, a vacuum deposition method, an electron-beam deposition method, a chemical vapor deposition (CVD) method or an electroplating method. Other techniques will be apparent to one skilled in the art.

The catalyst layer may be formed by, for example, coating palladium or platinum on the surface of the magnesium-containing thin film in a thickness range of 0.5 nm to 10 nm. Again, other materials and techniques will be apparent to one skilled in the art. The catalyst layer may also be prepared by, for example, a sputtering method, a vacuum deposition method, an electron-beam deposition method, a chemical vapor deposition (CVD) method or an electroplating method. Preferably, each of the magnesium-containing thin film and the catalyst layer is formed using a magnetron sputtering apparatus.

A switchable layer including the switchable mirror material is formed on the surface of a transparent substrate to provide a switchable mirror member, or on the surface of a glass substrate to provide a switchable mirror glass. The transparent substrate may be a transparent sheet made of acrylic material, plastic material, or any other suitable material having properties equivalent to those to of acrylic or plastic material.

Optionally, a protective layer may be formed on the surface of the switchable layer. The protective layer may be made of a hydrogen-permeable and water-impermeable material. The protective layer may be formed by any suitable method including, for example, by forming the protective layer as a sheet and attaching the sheet on the surface of the switchable layer, or by applying a protective material over the surface of the switchable layer. Other techniques for forming the protective layer will be apparent to one skilled in the art.

The protective layer may be formed as a sheet or thin film made of polyethylene, tantalum oxide ($Ta_2O_5$), zirconium oxide ($ZrO_2$), or any other suitable material having properties equivalent to those of polyethylene, tantalum oxide or zirconium oxide. The protective layer can provide enhanced durability in the switchable layer.

The switchable layer is formed on the inward-facing surface of the switchable mirror glass used as at least one of the glass plates in a window having a double or triple glazing structure, to provide a switchable mirror glass window. In this case, the states of the magnesium-containing thin film of the switchable layer in the switchable mirror glass window are switched by selectively supplying hydrogen gas and heated air or oxygen gas into at least one enclosed space defined between the glass plates of the switchable mirror glass window from an atmospheric-state controller to selectively adjust the level of hydrogenation and dehydrogenation in the magnesium-containing thin film. The atmospheric-state controller may be constructed as a modular unit detachably mounted onto an appropriate position of the switchable mirror glass window.

To switch the states of the magnesium-containing thin film, the level of hydrogenation is selectively adjusted through at least one of a gasochromic process using hydrogen gas and an electrochromic process using electrolyte containing proton, and the level of the dehydrogenation is selectively adjusted through at least one of a gasochromic process using air or oxygen gas, an electrochromic process using electrolyte and a thermochromic process based on heating.

A transition temperature at which the magnesium thin film is switched reversibly from a transparent state to a mirror state may be set at any temperature in the range of about 20° C. to 100° C. in advance to allow the magnesium thin film to be automatically switched from the transparent state to the mirror state at the preset temperature in response to a rise in atmospheric temperature. In this case, the transition temperature may be set depending on the thickness of the catalyst layer formed on the magnesium thin film. That is, the thickness of the catalyst layer can be adjusted to set the transition temperature at any temperature, for example, in the range of about 20° C. to 80° C.

A transition speed at which the magnesium-nickel alloy thin film is switched from a transparent state to a mirror state has a temperature dependency. Based on this property, the state of the magnesium-nickel alloy thin film can be automatically switched from the transparent state to the mirror state by increasing the temperature of the atmosphere around the switchable layer. The temperature dependency of the switchable layer can be adjusted by controlling the thickness of the catalyst layer formed on the surface of the magnesium-nickel alloy thin film.

The switchable layer may be formed on both the inward-facing surfaces of a pair of glass plates defining an enclosed space of a window having a double insulating glass structure, to reduce the light transmittance of the window in the mirror state and to increase the range of reflectivity. The switchable mirror glass may be used as an intermediate glass plate of a window having a triple glazing structure to provide enhanced thermal insulating effect.

In the switchable mirror glass, the variable range of the light transmittance is reduced as the thickness of the magnesium thin film as described in an aforementioned embodiment is reduced. For example, when the thickness of the magnesium thin film is 50 nm or more, the light transmittance of the switchable mirror glass is not changed at all even if it is exposed to hydrogen. When the thickness of the magnesium thin film is reduced less than 16 nm, the light transmittance in the transparent state increases. Under this condition, while the light transmittance in the mirror state also increases, more than 50% of the light transmittance can be assured. Thus, the thickness of the magnesium thin film is desirably set in the range of about 5 nm to about 40 nm.

The magnesium thin film is initially in the mirror state of providing metallic luster and high reflectivity in the switchable mirror glass. Through hydrogenation, the magnesium thin film is switched into the transparent state, and its optical spectrum is drastically changed. While there was a report on the optical change of magnesium thin films for exposure to hydrogen at a high temperature of 100° C. or more to switch into the transparent state, it is the first time that such a drastic change has been observed at about 20° C. The switchable mirror glass of the present invention can achieve more than 60% of visible-light transmittance. Thus, the transmittance value of the switchable mirror material of the present invention fulfills the rough standard for practically used window glasses, i.e., a light transmittance of 60% or more.

The switchable property of the switchable mirror glass comprising magnesium-nickel alloy thin film largely depends on a composition ratio of nickel to magnesium in the magnesium-nickel alloy thin film. The switchable mirror glass exhibits an excellent specific/selective switchable property when the magnesium-nickel alloy thin film has a composition ratio of nickel to magnesium is in the range of 0.1:1 to 0.3:1.

When the hydrogenated magnesium-nickel alloy $Mg_2Ni$ thin film is exposed to air after discharging the hydrogen gas, the thin film is oxidized at the same speed as that of hydrogenation therein, and returned to the mirror state.

In contrast, in the magnesium thin film of the present invention, even if the film having a very thin thickness is hydrogenated and then exposed to air, the thin film will be maintained in the transparent state, and its light transmittance will have almost no variation. However, when this film is heated up to 60° C., the light transmittance is reduced to return the film to the original mirror state. Such phenomenon that the state is changed in response to temperature is referred to as "thermochromic phenomenon". That is, the combination of the magnesium thin film and the catalyst layer, such as palladium, coated on the magnesium thin film provides a new material having both the gasochromic and thermochromic phenomenon.

On the other hand, in the magnesium-nickel alloy thin film of the present invention, the speed of dehydrogenation under air atmosphere largely depends on the temperature of the air atmosphere, and the dehydrogenation speed increases as the temperature increases. Such phenomenon that transmittance is varied according to temperature is also referred to as "thermochromic phenomenon". Thus, the above property allows the switchable mirror material of the present invention to be thermochromcally used. Such a switchable mirror material has not been found until the present invention.

These properties are effectively exerted particularly when the magnesium-containing thin film is used in windshields or another window glass of automobiles. That is, when an automobile is parked in hot summer, the thin film is automatically switched from the transparent state to the mirror state to reflect sunlight and prevent the temperature of the cabin space from increasing. The mirror state can be returned to the transparent state at any time by supplying hydrogen around the thin film. In addition, the temperature allowing the thin film to be returned to the mirror state can be varied by changing the thickness of the catalyst layer. Specifically, the thin film is switched to the mirror state at a lower transition temperature as the thickness of the catalyst layer increases. However, the increased thickness of the catalyst layer causes degradation of the light transmittance in the transparent state.

When the switchable mirror material of the present invention is used as a switchable mirror glass, it may be used as at least one of glass plates of a window having a double glazing structure. Further, the magnesium-containing thin film having a thin catalyst layer such as palladium coated thereon is positioned to face in the inward direction of the window, and an enclosed space is sealingly defined in the window. Then, a pair of holes are formed in any of the glass plates. One of the holes is connected to a discharge pipe having a cap, and the other hole is connected to a unit (atmospheric-state controller) for electrolyzing water to generate hydrogen and supplying hydrogen into the enclosed space, and for electrolyzing air or water to generate oxygen and supplying oxygen into the enclosed space. The magnesium-containing thin film can be switched to the transparent state at any time by supplying hydrogen from the atmospheric-state controller into the enclosed space.

If the atmospheric temperature is not changed, this state will be maintained. If the atmospheric temperature increases, the magnesium thin film will be automatically switched into the mirror state to reflect light and prevent light from transmitting therethrough. The film in the mirror state is returned to the transparent state at any time by supplying hydrogen into the enclosed space. The discharge pipe can be closed with the cap so as to hold the supplied hydrogen in the enclosed space to prevent the film from being returned to the mirror state. A hot air can be selectively supplied from the atmospheric-state controller into the enclosed space to switch from the transparent state to the mirror state.

When the atmosphere around the magnesium-nickel alloy thin film is changed to air or oxygen atmosphere containing no hydrogen, the thin film is dehydrogenated and gradually switched from the transparent state to the mirror state. The dehydrogenation speed increases as the temperature of the atmosphere increases. For example, under an atmospheric temperature of 40° C., the thin film is switched to the mirror state at the same speed as that in hydrogenation. Under an atmospheric temperature of 20° C., the thin film is gradually switched to the mirror state at a speed 10 times slower than that in hydrogenation. The mirror state can be switched to the transparent state by supplying oxygen gas or heated air from the atmospheric-state controller.

As described above, the present invention is directed to the switchable mirror material including the magnesium-containing thin film excellent in switchable mirror property, and the switchable mirror glass using the switchable mirror material. The switchable mirror material of the present invention having a thin palladium or platinum catalyst layer exhibits an excellent switchable mirror property far superior to the previously reported magnesium-nickel alloy $Mg_2Ni$. Thus, the switchable mirror material would open the way for putting switchable mirrors in practical use. The windows in houses are widely regarded as one of important matters, and a double or triple insulating glass structure is gradually taking the dominant position for windows in new houses.

The switchable layer including the switchable mirror material of the present invention can be advantageously applied onto the inward-facing surface of the switchable mirror glass used as at least one of glass plates in the switchable mirror glass window having a double or triple glazing glass structure to allow the states of the magnesium-containing thin film to be switched by introducing hydrogen gas and others into the enclosed space between the glass plates.

While the electrochromic switchable glass closest to practical use among switchable glasses has an excellent performance as described above, it is required to coat at least five layers with high quality, which leads to unacceptably increased cost. In contrast, the switchable mirror material of the present invention can be prepared by using a low-cost magnesium-containing thin film and a slight amount of catalytic material such as palladium coated on the thin film. Thus, the switchable mirror material is significantly advantageous in cost benefit terms. Hydrogen for switching the states can be handled more simply with enhanced safety, for example, by adjusting the distance between the glass plated in a double insulating glass structure. Under the prospect of increasing demand for a highly functional glass, it is noteworthy that the present invention provides a new switchable mirror material for switchable mirror glasses.

As discussed above, the switchable mirror glass can be effectively used as various window glasses for not only buildings but also vehicles including automobiles. In particular, when an automobile is parked in summer, the cabin space will be heated up to a high temperature of several dozen degrees. If the switchable mirror glass of the present invention is employed in the automobile, the magnesium-containing thin film of the switchable mirror glass is automatically switched from the transparent state to the mirror state to prevent the temperature of the cabin space from increasing. The mirror state can be conveniently returned to the transparent state at any time.

The switchable mirror glass can be widely used in not only windows but also various kinds of articles such as shielding for privacy protection, ornamental articles or toys utilizing the feature of switching between mirror and transparent states, to add the switchable mirror function thereto. The term "article" herein means the complete range of articles equipped with the switchable mirror glass.

While the present invention will now be described in conjunction with specific Examples, it is not limited thereto.

EXAMPLE 1

A magnesium thin film was formed by a triple magnetron sputtering apparatus as shown in FIG. 1. Metal magnesium and metal palladium are targets of two of three sputtering guns. A glass plate having a thickness of 1 mm was used as a substrate. After surface cleaning, the glass plate was placed in a vacuum chamber, and then the vacuum chamber was evacuated. In a sputtering film-forming process, a magnesium thin film was first formed by using the magnesium target. The film was sputtered under an argon gas pressure of 1.2 Pa, at Power 30 W through a DC sputtering method. Then, a palladium thin film was deposited under the same vacuum condition at Power 6W.

EXAMPLE 2

Figure 2:
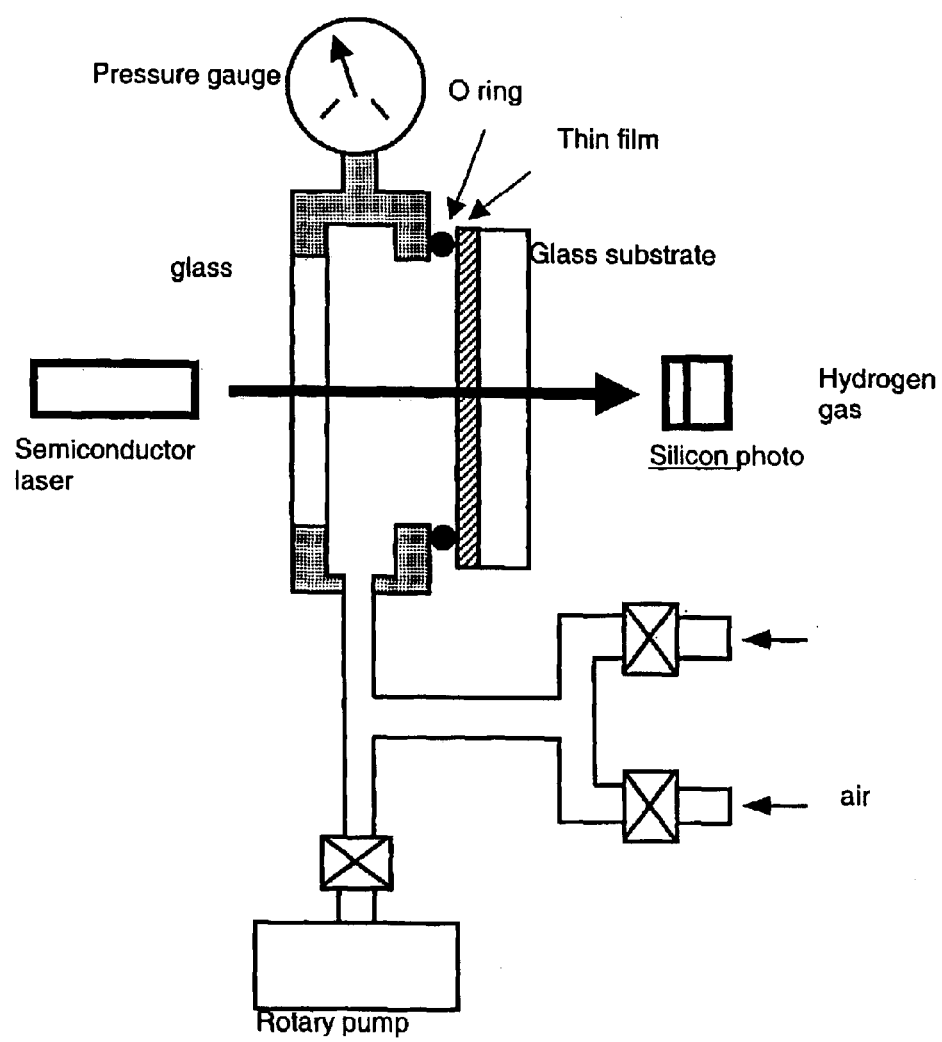
FIG. 2 is a schematic diagram showing an apparatus for evaluating the switchable property of the prepared magnesium-containing thin film.

The film obtained from Example 1 was attached to an apparatus as shown in FIG. 2 to evaluate the optical properties of the film. The sample is attached to a small chamber to allow the magnesium thin film to face toward the inside of the chamber, and hydrogen gas at 1 atm was introduced into the chamber. While maintaining this state, the variation of the light transmittance of the sample was determined by a combination measuring system of a semiconductor laser of 670 nm wavelength and a silicon photodiode.

Figure 3:
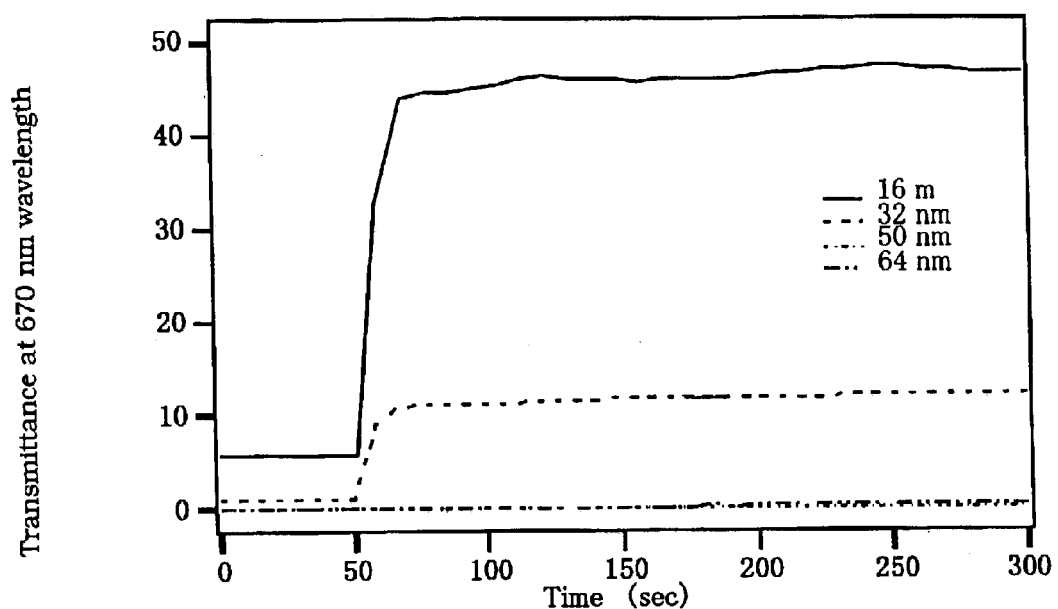
FIG. 3 shows the variance of light transmittance at a wavelength of 670 nm for samples each different in thickness of a magnesium thin film (hydrogen gas of 1 atm was introduced at the time T=50 s).

FIG. 3 shows the variation of light transmittance caused by hydrogenation under the conditions that the thickness of the palladium layer was kept at a constant value of 4 nm, and the thickness of the magnesium layer was increased. It was verified that the variation of light transmittance reduced as the thickness of the magnesium layer increased, and no variation of light transmittance was caused by the exposure of the magnesium layer to hydrogen when the thickness of the magnesium layer increased up to 50 nm or more.

The solid line in FIG. 3 shows the variation of light transmittance at 670 nm wavelength for a sample with the magnesium layer having a thickness of 16 nm, and the palladium layer having a thickness of 4 nm. The film had a metallic luster and almost no light transmittance just after film formation. Then, the gas in the chamber was once discharged and hydrogen was introduced into the chamber. After about 20 seconds, the light transmittance increased up to about 45%, and the film is switched into the transparent state. While the light transmittance in the transparent state increased as the thickness of the magnesium layer was reduced down to less than 16 nm, the transmittance in the mirror state also increased. When the thickness of the magnesium layer was further reduced down to 5 nm or less, the light transmittance increased up to greater than 50% even in the transparent state. Thus, a suitable thickness of the magnesium layer for use in a switchable mirror material is in the range of about 5 nm to about 40 nm.

EXAMPLE 3

Figure 4:
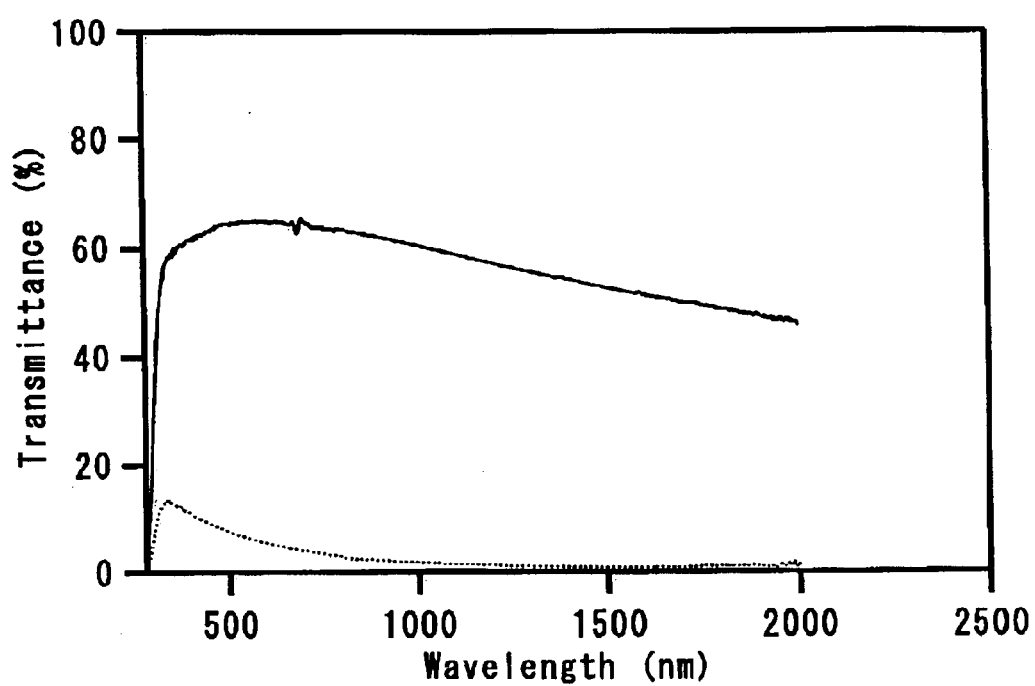
FIG. 4 shows optical transmittance spectra for a sample of a switchable mirror material comprising a magnesium thin film.
Figure 5:
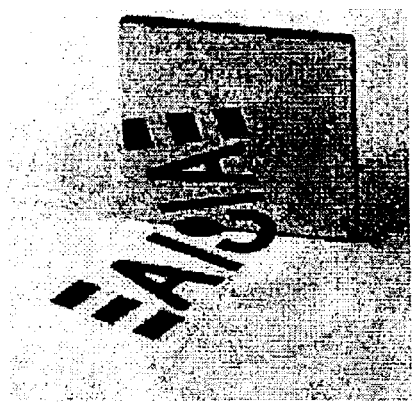
Figure 5:
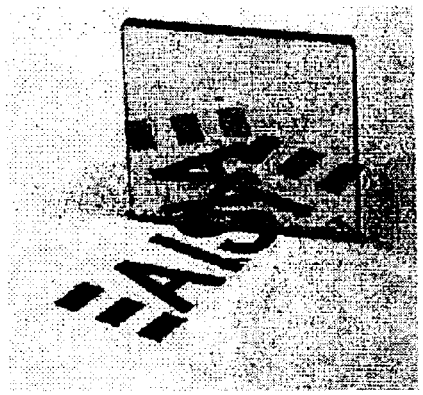

FIG. 4 shows an optical spectrum in the metallic state just after deposition for samples prepared such that the magnesium layer had a thickness of 25 nm, and the palladium layer had a thickness of 1.2 nm, and an optical spectrum after the sample was exposed to hydrogen atmosphere, and switched into the transparent state. FIG. 5 is a picture showing the state switching at that time. While this sample was initially in the mirror state having a metallic luster, it was hydrogenated and switched into the transparent state. As seen in FIG. 4, the transmittance spectrum is drastically changed in response to the state switching.

As seen in FIG. 5($a$), this sample was in the mirror state providing a high reflectivity in the mirror state. Upon exposure to hydrogen atmosphere, the sample was switched into the transparent state allowing the backside of the sample to be seen therethrough. While the conventional magnesium-nickel alloy $Mg_2Ni$ thin film has a dark brown even if it is hydrogenated, the material of the present invention was achromatic. A visible-light transmittance calculated from the light transmittance spectrum in the transparent state was about 63%. Thus, it was proved that the light transmittance of the material of the present invention fulfilled the rough standard for practically used window glasses, i.e., a light transmittance of 60% or more. A thin polyethylene sheet was attached to the above sample, and a test was performed in the same manner. As a result, it was verified that the durability of the sample was significantly improved.

EXAMPLE 4

A magnesium-nickel alloy thin film was formed by a triple magnetron sputtering apparatus as shown in FIG. 1. Metal magnesium, metal nickel and metal palladium serving as targets are set up to three sputtering guns, respectively. A glass plate having a thickness of 1 mm was used as a substrate. After rinse, the glass plate was placed in a vacuum chamber, and then the vacuum chamber was evacuated. In a sputtering film-forming process, a magnesium-nickel alloy thin film was first formed by using the magnesium and nickel targets. The film was sputtered under an argon gas pressure of 0.8 Pa, at Power 30 W for the magnesium target and Power 11 W for the nickel target through a DC sputtering method. Then, a palladium thin film was deposited under the same vacuum condition at Power 6W.

EXAMPLE 5

The film obtained in Example 4 was attached to an apparatus as shown in FIG. 2 to evaluate the optical properties of the film. The sample is attached to a small chamber to allow the magnesium-nickel alloy thin film to face toward the inside of the chamber. The chamber was evacuated, and then hydrogen gas of 1 atm was introduced into the chamber. While maintaining this state, the variation of the light transmittance of the sample was determined by a combination measuring system of a semiconductor laser of 670 nm wavelength and a silicon photodiode. Just after the deposition process, the magnesium-nickel alloy thin film has a metallic luster and high reflectivity. When this thin film is exposed to hydrogen gas, it is hydrogenated to increase the light transmittance of the thin film. It was verified that the speed of hydrogenation largely depends on the composition of the magnesium-nickel alloy. Thus, various magnesium-nickel alloy thin films having different compositions were prepared by variably adjusting the respective powers to be applied to the magnesium and nickel targets during the film formation process through sputtering method, and the respective switchable properties of the prepared thin films were evaluated.

Figure 6:
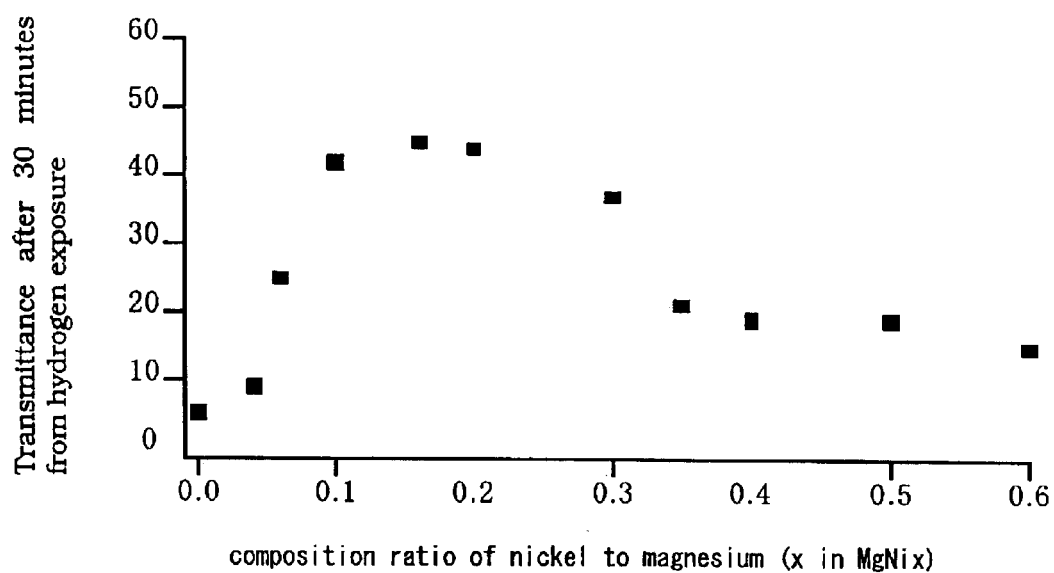
FIG. 6 shows light transmittances of samples each having a different composition ratio of Ni to Mg, at a wavelength of 670 nm after 30 minutes from exposure of the samples to hydrogen gas.

FIG. 6 shows light transmittance of the prepared magnesium-nickel alloy thin films having different compositions of the magnesium-nickel alloy ($MgNi_x$), at a wavelength of 670 nm, wherein the thin films were exposure to hydrogen gas of 1 atm for 30 minutes. Each of the magnesium-nickel alloy thin films had a thickness of 40 nm, and a thin palladium layer of 4 nm thickness was coated thereon.

As shown in FIG. 6, the visible-light transmittance in the transparent state is changed to have a maximum value at the composition ratio x of about 0.16. Further, an excellent switchable property is specifically exhibited in the x range of 0.1 to 0.3, particularly 0.16 to 0.2.

EXAMPLE 6

FIG. 7a shows an optical spectrum of a magnesium-nickel alloy thin film having a composition $MgNi_{0.2}$ or the ratio of magnesium to nickel of 5:1 (the thickness of the magnesium-nickel alloy thin film: 40 nm, the thickness of the palladium layer: 4 nm) in the mirror state just after deposition. FIG. 7b shows an optical spectrum of the magnesium-nickel alloy thin film in the transparent state caused by exposing the thin film to hydrogen atmosphere. These figures show that the sample initially in the mirror state with metallic luster, low light transmittance and high reflectivity is switched to the transparent with largely increased light transmittance and reduced reflectivity through hydrogenation. For reference, an optical spectrum of a magnesium-nickel alloy thin film having a composition $MgNi_{0.5}$ ($Mg_2Ni$) in the transparent state is also shown in FIG. 7a. As is apparent from FIG. 7a, the light transmittance of $MgNi_{0.2}$ has a variance about 3 times larger than that of $MgNi_{0.5}$.

EXAMPLE 7

Figure 8:
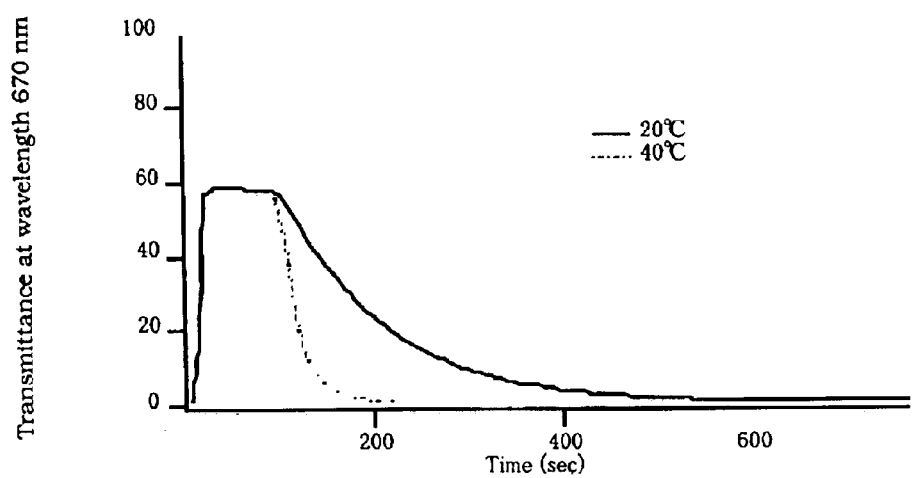
FIG. 8 shows the variation of light transmittance of a sample having a composition of $MgNi_{0.2}$ at different temperatures, wherein hydrogen gas of 1 atm was introduced at the time T=5 s, and then air of 1 atm was introduced at the time T=100 s.

FIG. 8 shows the temperature dependence of dehydrogenation of a magnesium-nickel alloy thin film having a composition $MgNi_{0.2}$ or the ratio of magnesium to nickel of 5:1 (the thickness of the magnesium-nickel alloy thin film: 40 nm, the thickness of the palladium layer: 4 nm) when the thin film was exposed to hydrogen gas of 1 atm and to air of 1 atm. When the thin film was exposed to the hydrogen gas, it was hydrogenated and quickly switched to the transparent state within about 20 seconds. When the thin film was exposed to air, it was dehydrogenated and switched to the mirror state. Under an atmospheric temperature of 20° C., the speed in the dehydrogenation was slower than that in the hydrogenation, and it takes about 500 seconds.

As shown in FIG. 8, when the atmospheric temperature is set at 40° C., the speed in the hydrogenation does not change, but the speed in the dehydrogenation increases. From this data, it was verified that the transition speed from the transparent state to the mirror state can be controlled by adjusting the atmospheric temperature.

Figure 7:
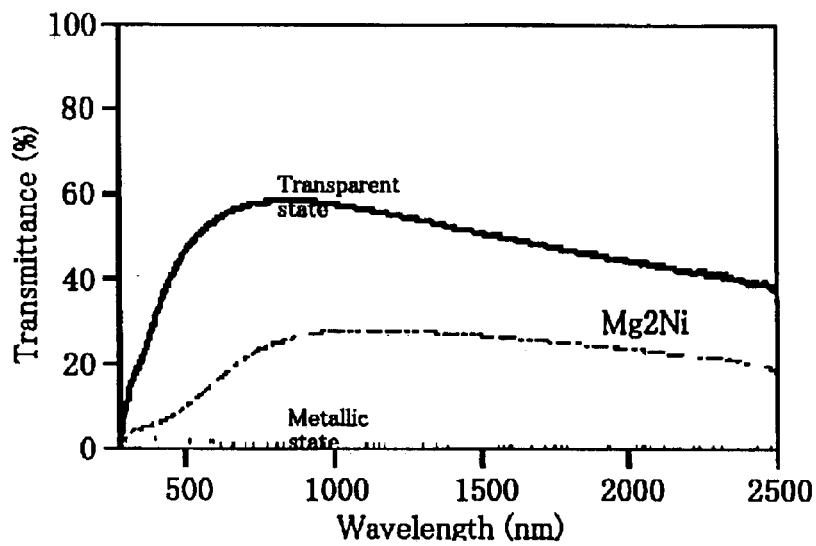
Figure 7:
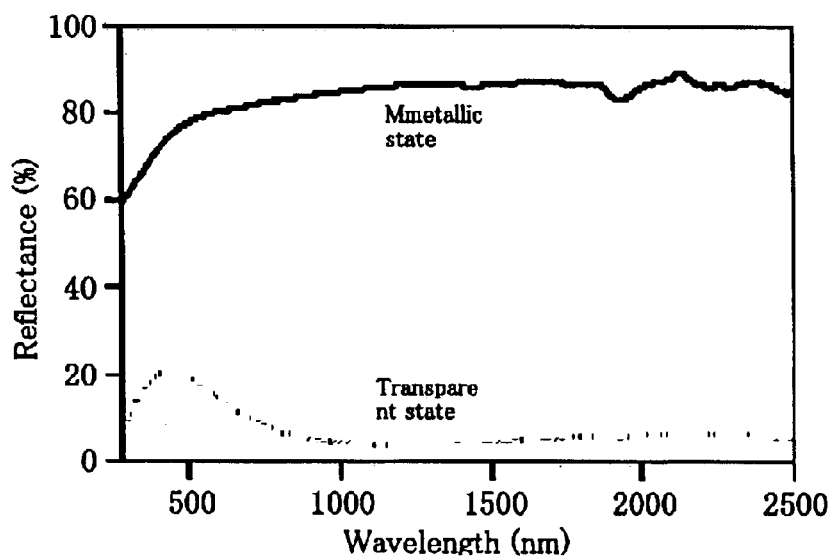

A deposited magnesium-nickel alloy thin film has metallic luster and high reflectivity in the mirror state. Upon exposure to hydrogen atmosphere, the sample is switched to the transparent state allowing the backside of the sample to be seen therethrough. While the conventional magnesium-nickel alloy $Mg_2Ni$ thin film has a dark brown color even if it is hydrogenated, the material of the present invention has a light yellow color. A visible-light transmittance calculated from the light transmittance spectrum in the transparent state in FIG. 7 is about 50%, which is a significantly improved value as compared to 20% in the conventional $Mg_2Ni$.

EXAMPLE 8

Figure 9:
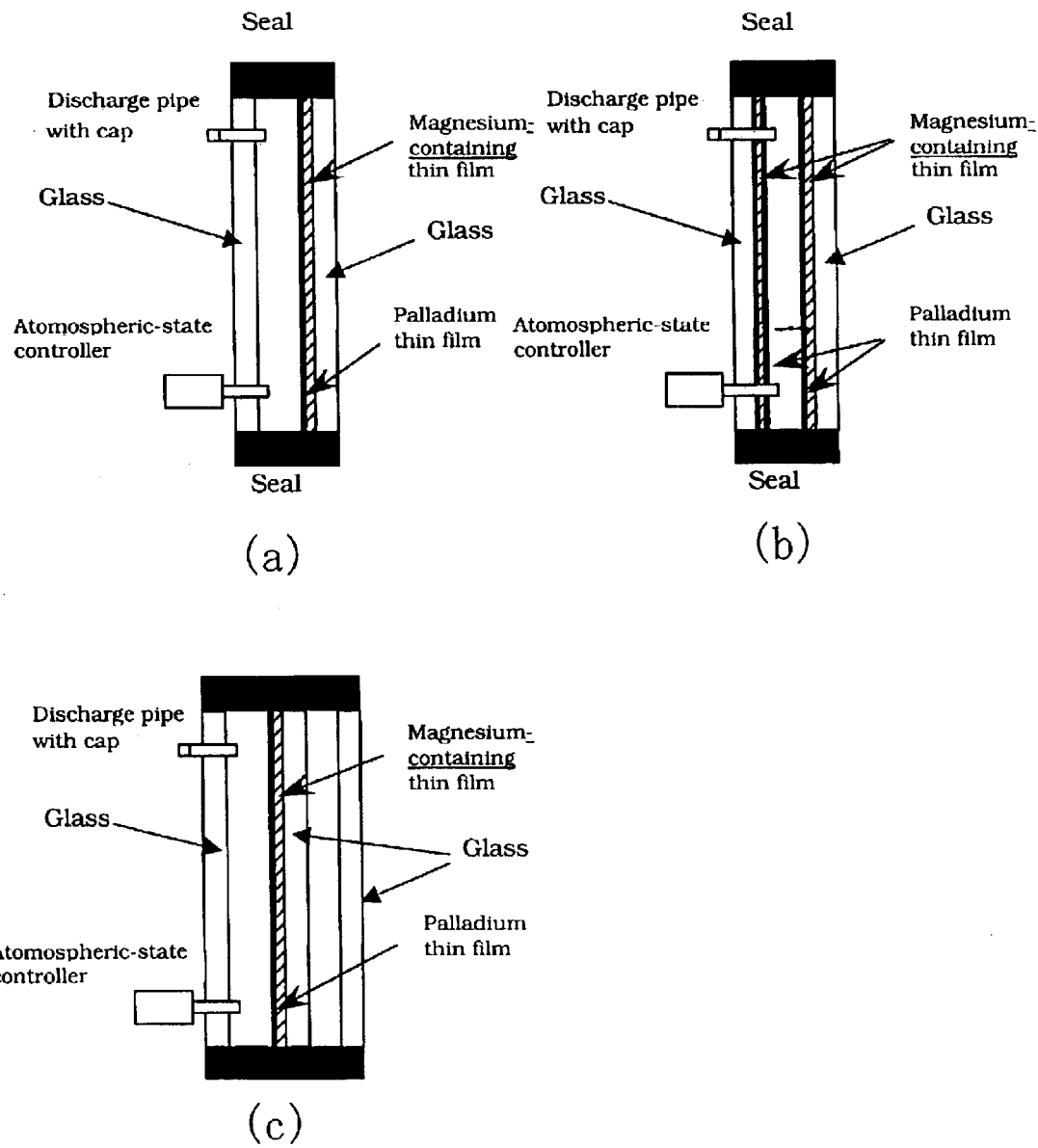
FIGS. 9a, 9b and 9c are schematic block diagrams showing three types of switchable mirror glass windows of the present invention.

The magnesium-containing thin film having a thin palladium coating were positioned to face in the inward direction of a window in a double insulating glass structure, and an enclosed space was sealingly defined in the window. Then, a pair of holes was formed in the window. One of the holes was connected to a discharge pipe having a cap, and the other hole was connected to a unit (atmospheric-state controller) for electrolyzing water to generate hydrogen and supplying hydrogen into the enclosed space, and for electrolyzing air or water to generate oxygen and supplying oxygen into the enclosed space. In this way, a switchable mirror glass window was constructed. This switchable mirror glass window is shown in FIG. 9a. The magnesium-containing thin film could be switched to the transparent state at any time by supplying hydrogen from the atmospheric-state controller into the enclosed space.

When the atmospheric temperature was not changed, this state of the magnesium thin film was maintained. When the atmospheric temperature was increased, the magnesium thin film was automatically switched into the mirror state to reflect light and prevent light from transmitting therethrough. The film in the mirror state could be returned to the transparent state at any time by supplying hydrogen into the enclosed space. It was verified that the discharge pipe could be closed with the cap so as to hold the supplied hydrogen in the enclosed space to prevent the film from being returned to the metallic state. It was also verified that hot air could be selectively supplied from the atmospheric-state controller into the enclosed space to switch from the transparent state to the mirror state.

The transparent state of the magnesium-nickel alloy thin film could be maintained by filling hydrogen gas in the enclosed space. When air or oxygen gas was supplied to the enclosed space, the magnesium-nickel alloy thin film was gradually switched to the metallic state automatically to reflect light and prevent light from transmitting therethrough. When heated air or heated oxygen gas was supplied to the enclosed space, the thin film was quickly returned to the metallic state.

As shown in FIG. 9b, another switchable mirror glass window having a reduced light transmittance and an increased reflectivity range in the mirror state was constructed by forming the switchable layer on both the inward-facing surfaces of a pair of glass plates defining an enclosed space of a window having a double insulating glass structure.

As shown in FIG. 9c, still another switchable mirror glass window having an excellent heat insulating performance was constructed by using the switchable mirror glass as an intermediate glass plate of a window having a triple insulating glass structure. These windows have the same switchable property as that of the aforementioned switchable mirror glass window.

Although the invention has been described with respect to specific embodiments, the details are not to be construed as limitations, for it will become apparent that various embodiments, changes and modifications may be resorted to without departing from the spirit and scope thereof, and it is understood that such equivalent embodiments are intended to be included within the scope of this invention.

What is claimed is:

1. A switchable mirror material comprising:
   (1) a magnesium thin film having a thickness of 40 nm or less, or
   a magnesium-nickel alloy thin film having an alloy composition represented by MgNix wherein $0.1<x<0.3$; and
   (2) a transparent catalyst layer formed on a surface of said thin film, wherein
   said switchable mirror material has a chromic property which allows said thin film to be switched from a mirror state into a transparent state by means of hydrogenation of said thin film at about 20° C., and to be switched from said transparent state into said mirror state by means of dehydrogenation of said thin film in a temperature range of said about 20° C. to 100° C.

2. The switchable mirror material as defined in claim 1, wherein said magnesium thin film has a thickness of about 5 to about 40 nm.

3. The switchable mirror layers as defined in claim 1, wherein said catalyst layer is a palladium or platinum layer having a thickness of 0.5 to 10 nm.

4. The switchable mirror material as defined in claim 1, further comprising a transparent protective layer, wherein said transparent protective layer is formed on said catalyst layer.

5. The switchable mirror material as defined in claim 4, wherein said magnesium thin film has a thickness of about 5 to about 40 nm.

6. The switchable mirror material as defined in claim 4, wherein said catalyst layer is a palladium or platinum layer having a thickness of 0.5 to 10 nm.

7. The switchable mirror material as defined in claim 4, wherein said protective layer is made of a hydrogen-permeable and water-impermeable material.

8. A method of switching the states of a switchable mirror member or glass comprising a switchable layer including the switchable mirror material as defined in claim 1, 2 and 4, comprising a step of adjusting dehydrogenation speed in said switchable layer under a gas atmosphere by controlling the temperature of said gas atmosphere.

9. A switchable mirror member comprising a transparent substrate, and a switchable layer including a switchable mirror material comprising:
   (1) a magnesium thin film having a thickness of 40 nm or less, or
   a magnesium-nickel alloy thin film having an alloy composition represented by MgNix wherein $0.1<x<0.3$; and
   (2) a transparent catalyst layer formed on a surface of said thin film, wherein
   said switchable mirror material has a chromic property which allows said thin film to be switched from a mirror state into a transparent state by means of hydrogenation of said thin film at about 20° C., and to be switched from said transparent state into said mirror state by means of dehydrogenation of said thin film in a temperature range of said about 20° C. to 100° C., and
   said switchable layer is formed on a surface of said transparent substrate.

10. The switchable mirror member as defined in claim 9, wherein said magnesium thin film has a thickness of about 5 to about 40 nm.

11. The switchable mirror member as defined in claim 9, wherein said catalyst layer is a palladium or platinum layer having a thickness of 0.5 to 10 nm.

12. The switchable mirror member as defined in any one of claims 9–11, wherein said switchable mirror material further comprises a transparent protective layer, wherein said transparent protective layer is formed on said catalyst layer.

13. The switchable mirror member as defined in any one of claims 9–12, wherein said transparent substrate is a transparent sheet made of acrylic or plastic material.

14. A switchable mirror glass comprising a glass substrate, and a switchable layer including a switchable mirror material comprising:
   (1) a magnesium thin film having a thickness of 40 nm or less, or
   a magnesium-nickel alloy thin film having an alloy composition represented by MgNix wherein $0.1<x<0.3$; and
   (2) a transparent catalyst layer formed on a surface of said thin film, wherein
   said switchable mirror material has a chromic property which allows said thin film to be switched from a mirror state into a transparent state by means of hydrogenation of said thin film at about 20° C., and to be switched from said transparent state into said mirror state by means of dehydrogenation of said thin film in a temperature range of said about 20° C. to 100° C., and
   said switchable layer is formed on a surface of said glass substrate.

15. The switchable mirror glass as defined in claim 14, wherein said magnesium thin film has a thickness of about 5 to about 40 nm.

16. The switchable mirror glass as defined in claim 14, wherein said catalyst layer is a palladium or platinum layer having a thickness of 0.5 to 10 nm.

17. The switchable mirror glass as defined in any one of claims 14–16, wherein said switchable mirror material further comprises a transparent protective layer, wherein said transparent protective layer is formed on said catalyst layer.

18. A switchable mirror glass window having an insulating glass structure which includes a plurality of glass plates disposed in parallel with each other to define at least one enclosed space therebetween, wherein at least one of said glass plates is composed of a switchable mirror glass comprising a glass substrate, and a switchable layer including a switchable mirror material comprising:

(1) a magnesium thin film having a thickness of 40 nm or less, or a magnesium-nickel alloy thin film having an alloy composition represented by MgNix wherein $0.1<x<0.3$; and (2) a transparent catalyst layer formed on a surface of said thin film, wherein said switchable mirror material has a chromic property which allows said thin film to be switched from a mirror state into a transparent state by means of hydrogenation of said thin film at about 20° C., and to be switched from said transparent state into said mirror state by means of dehydrogenation of said thin film in a temperature range of said about 20° C. to 100° C.;

said switchable layer is formed on a surface of said glass substrate; and said switchable layer faces in the inward direction of said insulating glass structure.

19. The switchable mirror glass window as defined in claim 18, wherein said magnesium thin film has a thickness of about 5 to about 40 nm.

20. The switchable mirror glass window as defined in claim 18, wherein said catalyst layer is a palladium or platinum layer having a thickness of 0.5 to 10 nm.

21. The switchable mirror glass window as defined in any one of claims 18–20, wherein said switchable mirror material further comprises a transparent protective layer, wherein said transparent protective layer is formed on said catalyst layer.

22. The switchable mirror glass window as defined in any one of claims 18–20, wherein said enclosed space is selectively supplied with either one of: (1) hydrogen gas and (2) heated air or oxygen gas, from an atmospheric-state controller.

23. A method of switching the states of a switchable mirror glass comprising a switchable layer including a switchable mirror material comprising:

(1) a magnesium thin film having a thickness of 40 nm or less, or a magnesium-nickel alloy thin film having an alloy composition represented by MgNix wherein $0.1<x<0.3$; and (2) a transparent catalyst layer formed on a surface of said thin film, wherein said switchable mirror material has a chromic property which allows said thin film to be switched from a mirror state into a transparent state by means of hydrogenation of said thin film at about 20° C., and to be switched from said transparent state into said mirror state by means of dehydrogenation of said thin film in a temperature range of said about 20° C. to 100° C., comprising a step of selectively causing hydrogenation and dehydrogenation in said switchable layer, by means of selectively adjusting the level of said hydrogenation through at least one of a gasochromic process using hydrogen gas and an electrochromic process using electrolyte containing hydrogen, and selectively adjusting the level of the dehydrogenation through at least one of a gasochromic process using air or oxygen gas, an electrochromic process using electrolyte and a thermochromic process based on heating.

24. The method of switching the states of a switchable mirror glass as defined in claim 23, wherein said switchable mirror material further comprises a transparent protective layer, wherein said transparent protective layer is formed on said catalyst layer.

25. A method of switching the states of a switchable mirror member or glass with a switchable layer including a switchable mirror material comprising:

(1) a magnesium thin film having a thickness of 40 nm or less, or a magnesium-nickel alloy thin film having an alloy composition represented by MgNix wherein $0.1<x<0.3$; and (2) a transparent catalyst layer formed on a surface of said thin film, wherein said switchable mirror material has a chromic property which allows said thin film to be switched from a mirror state into a transparent state by means of hydrogenation of said thin film at about 20° C., and to be switched from said transparent state into said mirror state by means of dehydrogenation of said thin film in a temperature range of said about 20° C. to 100° C., comprising a step of presetting a transition temperature of said magnesium thin film at any temperature in a range of about 20° C. to 100° C. to allow said magnesium thin film to be automatically switched from the transparent state to the mirror state at said preset temperature in response to a rise in atmospheric temperature.

26. The method as defined in claim 25, wherein said transition temperature is set depending on the thickness of said catalyst layer.

27. An article comprising a switchable layer including the switchable mirror material comprising:

(1) a magnesium thin film having a thickness of 40 nm or less, or a magnesium-nickel alloy thin film having an alloy composition represented by MgNix wherein $0.1<x<0.3$; and (2) a transparent catalyst layer formed on a surface of said thin film, wherein said switchable mirror material has a chromic property which allows said thin film to be switched from a mirror state into a transparent state by means of hydrogenation of said thin film at about 20° C., and to be switched from said transparent state into said mirror state by means of dehydrogenation of said thin film in a temperature range of said about 20° C. to 100° C., and (3) either one of a switchable mirror glass and a switchable mirror member having a transparent substrate, wherein said switchable layer is attached onto the surface of said switchable mirror glass or said transparent substrate.

* * * * *